(12) United States Patent
Suzuki et al.

(10) Patent No.: US 9,774,052 B2
(45) Date of Patent: Sep. 26, 2017

(54) HYDROGEN PRODUCING DEVICE AND HYDROGEN PRODUCING UNIT AND ENERGY SYSTEM INCLUDING THE HYDROGEN PRODUCING DEVICE AND THE HYDROGEN PRODUCING UNIT

(71) Applicant: Panasonic Intellectual Property Management Co., Ltd., Osaka (JP)

(72) Inventors: Takahiro Suzuki, Osaka (JP); Takaiki Nomura, Osaka (JP); Kazuhito Hato, Osaka (JP); Tatsuo Fujita, Osaka (JP); Satoru Tamura, Osaka (JP); Yoshihiro Kozawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 359 days.

(21) Appl. No.: 14/391,176

(22) PCT Filed: Dec. 24, 2013

(86) PCT No.: PCT/JP2013/007534
§ 371 (c)(1),
(2) Date: Oct. 8, 2014

(87) PCT Pub. No.: WO2014/128813
PCT Pub. Date: Aug. 28, 2014

(65) Prior Publication Data
US 2015/0072254 A1  Mar. 12, 2015

(30) Foreign Application Priority Data

Feb. 21, 2013  (JP) .................................. 2013-031679

(51) Int. Cl.
*C25B 1/04* (2006.01)
*C25B 15/08* (2006.01)
(Continued)

(52) U.S. Cl.
CPC ............ *H01M 8/0656* (2013.01); *C25B 1/003* (2013.01); *C25B 1/04* (2013.01); *C25B 9/18* (2013.01);
(Continued)

(58) Field of Classification Search
CPC .. C25B 1/003; C25B 1/04; C25B 9/00; C25B 9/18; C25B 15/08; H01M 8/0656;
(Continued)

(56) References Cited

U.S. PATENT DOCUMENTS 4,273,626 A * 6/1981 Ezzell ..................... C25B 15/08
205/347
2012/0237842 A1  9/2012 Suzuki et al.
2012/0276464 A1  11/2012 Kuroha et al.

FOREIGN PATENT DOCUMENTS

CN  102575361  7/2012
CN  102686314  9/2012
(Continued)

OTHER PUBLICATIONS

International Search Report of PCT application No. PCT/JP2013/007534 dated Mar. 25, 2014.
(Continued)

*Primary Examiner* — Ciel Thomas
(74) *Attorney, Agent, or Firm* — McDermott Will & Emery LLP

(57) ABSTRACT

In a hydrogen producing device, an electrolyte flow path between a plurality of hydrogen producing cells is disposed in a hydrogen production side and in an oxygen production side, separately. Further, an electrolyte flow path is formed through which the electrolyte flows downward from the top between the plurality of hydrogen producing cells, and on the other hand the electrolyte flows upward from the bottom within each hydrogen producing cell. Moreover, a contact (Continued)

point with a produced gas or an atmosphere is provided in a pathway of the electrolyte flow path.

11 Claims, 8 Drawing Sheets

(51) Int. Cl.
    *H01M 8/0656*     (2016.01)
    *H01M 8/10*     (2016.01)
    *C25B 9/18*     (2006.01)
    *H01M 8/04089*     (2016.01)
    *C25B 1/00*     (2006.01)
    *H01M 8/06*     (2016.01)
    *H01M 8/04082*     (2016.01)
    *H01M 8/1018*     (2016.01)

(52) U.S. Cl.
    CPC ......... *C25B 15/08* (2013.01); *H01M 8/04089* (2013.01); *H01M 8/10* (2013.01); *H01M 8/04201* (2013.01); *H01M 2008/1095* (2013.01); *Y02E 60/364* (2013.01); *Y02E 60/366* (2013.01)

(58) Field of Classification Search
    CPC ............... H01M 8/10; H01M 8/04201; H01M 2008/1095; Y02E 60/364; Y02E 60/366
    See application file for complete search history.

(56) References Cited

FOREIGN PATENT DOCUMENTS

| | | |
|---|---|---|
| JP | 2004-197167 | 7/2004 |
| JP | 2008-075097 | 4/2008 |
| JP | 2010-247109 | 11/2010 |
| JP | 2011-213553 | 10/2011 |
| JP | 2012-177159 | 9/2012 |
| JP | 2012-188683 | 10/2012 |
| JP | 2012-193428 | 10/2012 |
| WO | 2011/058723 | 5/2011 |
| WO | 2012/090390 | 7/2012 |
| WO | 2012/114787 | 8/2012 |

OTHER PUBLICATIONS

English Translation of Chinese Search Report dated Apr. 7, 2016 for the related Chinese Patent Application No. 201380020848.4.

\* cited by examiner

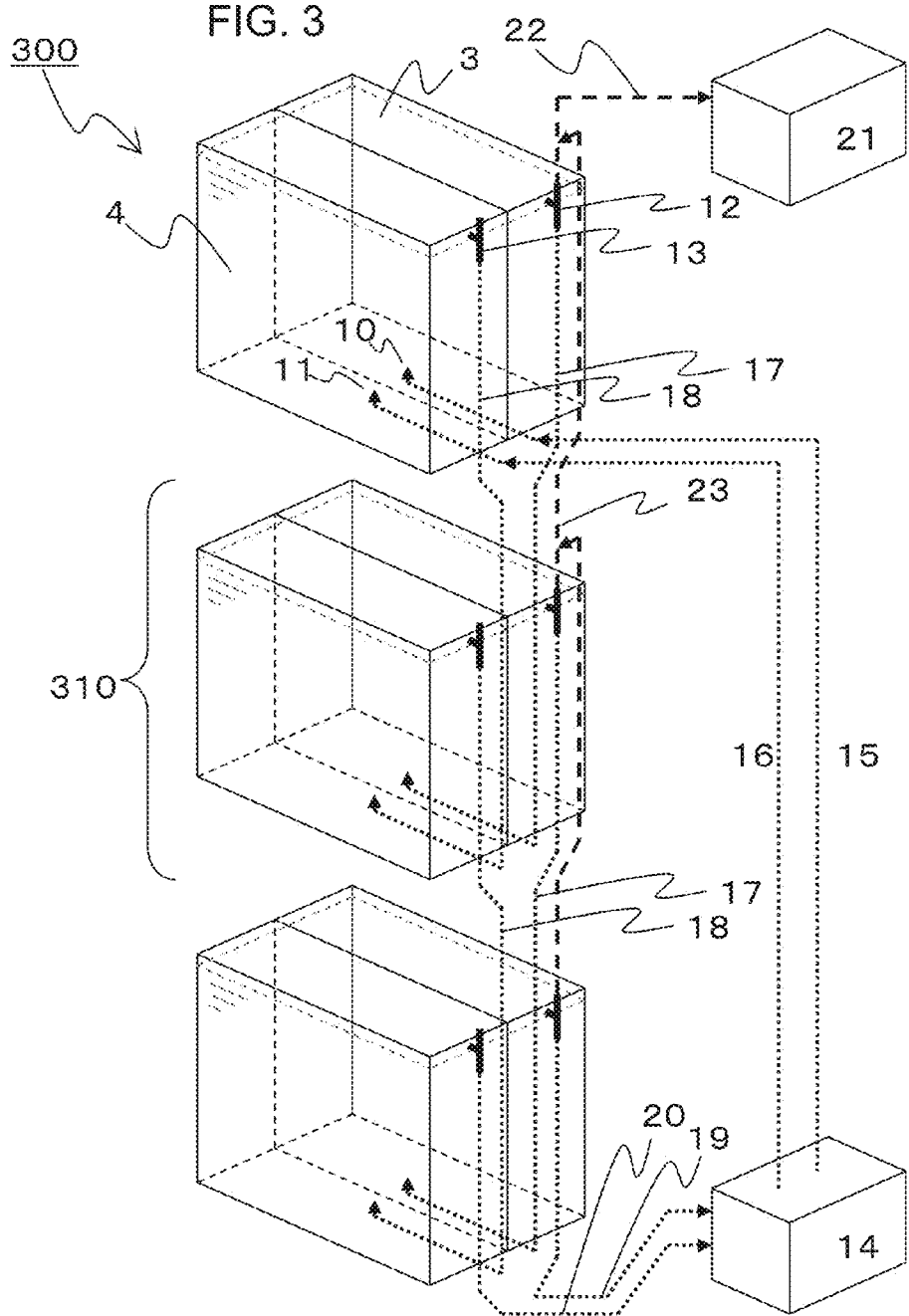

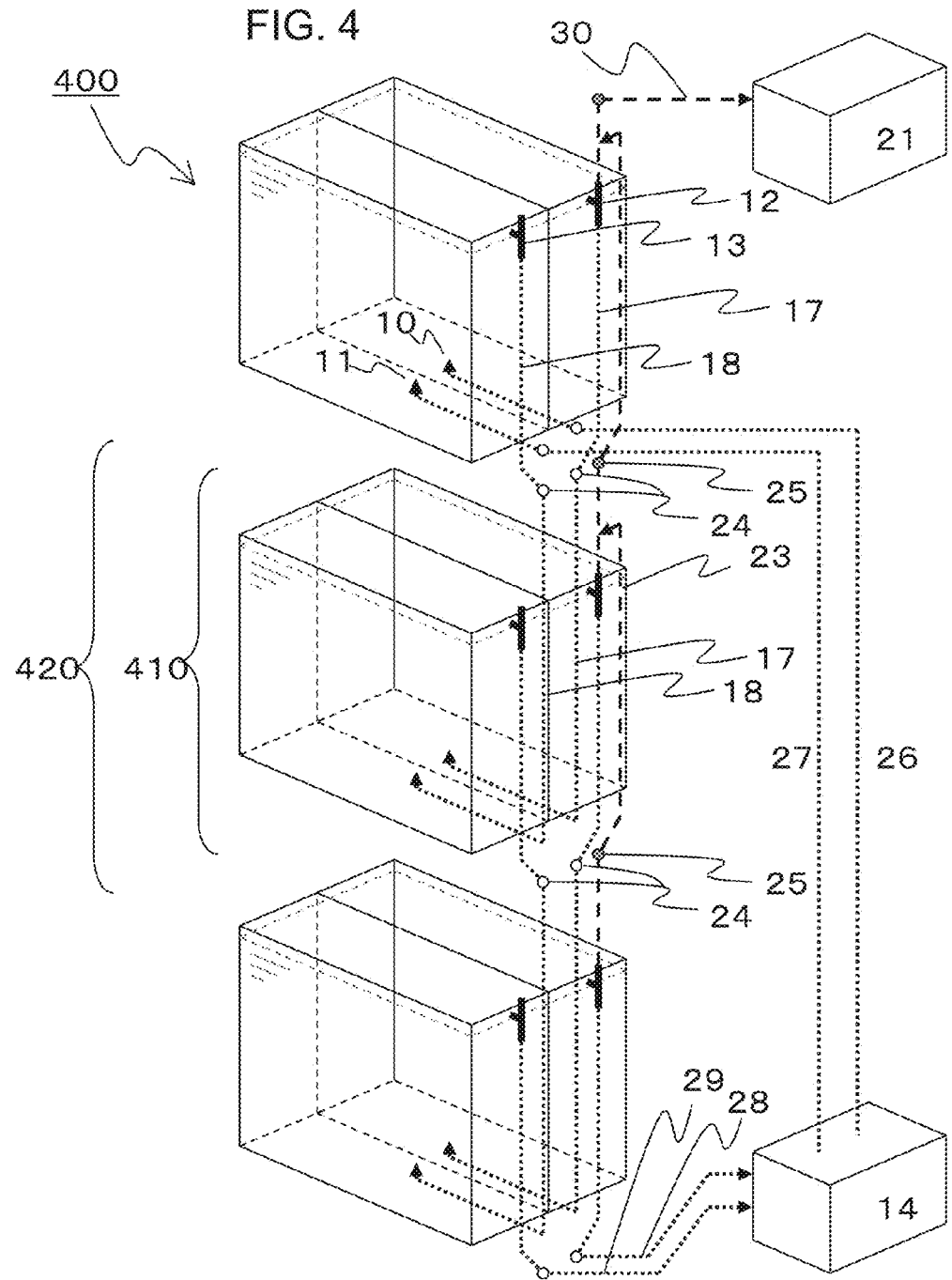

HYDROGEN PRODUCING DEVICE AND HYDROGEN PRODUCING UNIT AND ENERGY SYSTEM INCLUDING THE HYDROGEN PRODUCING DEVICE AND THE HYDROGEN PRODUCING UNIT

TECHNICAL FIELD

The present disclosure relates to a hydrogen producing device and a hydrogen producing unit, which decompose water into hydrogen and oxygen to obtain hydrogen by use of light, as well as an energy system including the hydrogen producing device and the hydrogen producing unit.

BACKGROUND

Conventionally, as a method for utilization of a semiconductor material functioning as a photocatalyst, it is known to decompose water to produce hydrogen or to generate electrical energy by irradiating a semiconductor material with light (for example, PTL 1).

PTL 1 discloses a photo-assisted water electrolysis apparatus having a function of converting light energy obtained from solar light to hydrogen energy. The photo-assisted water electrolysis apparatus is composed of a plurality of laminated photo-assisted water electrolysis cells.

Each photo-assisted water electrolysis cell has a box-like casing whose peripheral portion is surrounded with an outer wall made of a transparent glass or synthetic resin plate, and is arranged in a state of being inclined at a given angle from the horizontal state. An electrolyte is accommodated in a lower portion of the photo-assisted water electrolysis cell, and a separation wall which divides the photo-assisted water electrolysis cell into two spaces is provided in the middle of the thickness direction of the cell. The separation wall is formed by integrally joining a gas separation membrane arranged on an upper side with a photo-assisted water electrolysis electrode/membrane assembly arranged on a lower side, and plays a role of separating the produced hydrogen from the produced oxygen.

In the photo-assisted water electrolysis electrode/membrane assembly, a photocatalyst electrode and a platinum counter electrode are respectively formed on both surfaces of a Nafion membrane which is an ionic conductive membrane arranged in the middle of the thickness direction. In the photo-assisted water electrolysis electrode/membrane assembly, irradiation of solar light causes the photo-assisted water electrolysis, and oxygen is produced from the photocatalyst electrode and hydrogen is produced from the platinum counter electrode. Further, the lower end of the separation wall is provided with a rectangular through hole, and the electrolyte can be circulated within the photo-assisted water electrolysis cell through the through hole.

Further, in an outer wall of the photo-assisted water electrolysis cell, a rectangular circulation hole in planar view is formed, and a movable wall which makes the opening area of the circulation hole freely variable is provided. The movable wall is configured slidably along a height direction (longitudinal direction) of an outer wall, and the opening area of an opening is decreased when the movable wall moves upward, and the opening area of an opening is increased when the movable wall moves downward. Herein, an upper end of the photo-assisted water electrolysis electrode/membrane assembly is arranged at substantially the same height as an upper end of the movable wall.

Further, a foot of a perpendicular drawn from the upper end of the photo-assisted water electrolysis electrode/membrane assembly toward the outer wall of the photo-assisted water electrolysis cell agrees with a position of a lower end of the circulation hole. Thus, a liquid height of the electrolyte in the photo-assisted water electrolysis cell substantially agrees with a height of the upper end of the photo-assisted water electrolysis electrode/membrane assembly and that of the upper end of the movable wall. A circulation hole is disposed in the outer wall of the photo-assisted water electrolysis cell and configured so as to enable circulation of the electrolyte through the circulation hole between neighboring photo-assisted water electrolysis cells.

Therefore, from the viewpoint of a flow of the electrolyte, in each photo-assisted water electrolysis cell, the electrolyte having flown through a circulation hole on an upstream side passes through the through hole and is flown out from a circulation hole on a downstream side. When the photo-assisted water electrolysis cells are connected in series in relation to the flow of the electrolyte, this enables supply and discharge of the electrolyte in all photo-assisted water electrolysis cells.

However, in the case of the photo-assisted water electrolysis apparatus, the space of each photo-assisted water electrolysis cell on a photocatalyst electrode side is communicated with a space of a photo-assisted water electrolysis cell on a platinum counter electrode side which is upwardly adjacent to this photo-assisted water electrolysis cell through a circulation hole. Similarly, the space of each photo-assisted water electrolysis cell on a photocatalyst electrode side is communicated with a space of a photo-assisted water electrolysis cell on a photocatalyst electrode side which is downwardly adjacent to this photo-assisted water electrolysis cell through a circulation hole.

Therefore, hydrogen and oxygen produced in each photo-assisted water electrolysis cell are easily mixed with each other through a circulation hole. Further, a portion of oxygen bubbles produced at the surface of the photocatalyst electrode is swept away beyond the through hole by the electrolyte, enters the space on the platinum counter electrode side and is mixed with hydrogen bubbles produced at the surface of the platinum counter electrode.

That is, in the photo-assisted water electrolysis apparatus, it is not possible to collect hydrogen and oxygen separately because of the structure even though a location of hydrogen production is different from that of oxygen production.

CITATION LIST

Patent Literature

PTL 1: Unexamined Japanese Patent Publication No. 2008-75097

SUMMARY

A hydrogen producing device of the present disclosure includes a plurality of hydrogen producing cells, the cell having:
a housing including a surface having a light-transmitting property; a separator separating a space within the housing into a hydrogen-side space and an oxygen-side space; a counter electrode arranged in the hydrogen-side space; an optical semiconductor electrode arranged in the oxygen-side space and formed on a conductive substrate; an electrical connection part electrically connecting the optical semiconductor electrode with the counter electrode; an electrolyte containing water in the hydrogen-side space and in the oxygen-side space; a hydrogen-side electrolyte supply hole penetrating the housing at a bottom portion of the hydrogen-side space and supplying the electrolyte into the hydrogen-side space; an oxygen-side electrolyte supply hole penetrating the housing at a bottom portion of the oxygen-side space and supplying the electrolyte into the oxygen-side space; a hydrogen-side gas-liquid branch pipe penetrating the housing in contact with the hydrogen-side space at a gas-liquid introduction port of the branch pipe and arranged at a position higher than an uppermost portion of the counter electrode; and an oxygen-side gas-liquid branch pipe penetrating the housing in contact with the oxygen-side space at a gas-liquid introduction port of the branch pipe and arranged at a position higher than an uppermost portion of the optical semiconductor electrode.

The hydrogen producing device further includes an electrolyte storage unit for sending the electrolyte out to the hydrogen producing cell and recovering the electrolyte from the hydrogen producing cell; a hydrogen-side electrolyte supply pipe extending from the electrolyte storage unit and being connected to the hydrogen-side electrolyte supply hole of the hydrogen producing cell arranged at the highest position; an oxygen-side electrolyte supply pipe extending from the electrolyte storage unit and being connected to the oxygen-side electrolyte supply hole of the hydrogen producing cell arranged at the highest position; a hydrogen-side electrolyte circulation pipe extending from a liquid discharge port of the hydrogen-side gas-liquid branch pipe of each of the hydrogen producing cells excluding the hydrogen producing cell arranged at the lowest position and being connected to the hydrogen-side electrolyte supply hole of the hydrogen producing cell downwardly adjacent to the hydrogen producing cell; an oxygen-side electrolyte circulation pipe extending from a liquid discharge port of the oxygen-side gas-liquid branch pipe of each of the hydrogen producing cells excluding the hydrogen producing cell arranged at the lowest position and being connected to the oxygen-side electrolyte supply hole of the hydrogen producing cell downwardly adjacent to the hydrogen producing cell; a hydrogen-side electrolyte recovery pipe extending from a liquid discharge port of the hydrogen-side gas-liquid branch pipe of the hydrogen producing cell arranged at the lowest position and being connected to the electrolyte storage unit; and an oxygen-side electrolyte recovery pipe extending from a liquid discharge port of the oxygen-side gas-liquid branch pipe of the hydrogen producing cell arranged at the lowest position and being connected to the electrolyte storage unit.

By employing such a configuration, water is decomposed to produce hydrogen by irradiating the optical semiconductor electrodes of the plurality of hydrogen producing cells with light.

In accordance with the hydrogen producing device and the hydrogen producing unit as well as the energy system including the hydrogen producing device and the hydrogen producing unit according to the present disclosure, it is possible to solve the above-mentioned problem concerning separation collection of hydrogen and oxygen in a plurality of hydrogen producing cells, and it is possible to simultaneously solve a problem arising in circulating an electrolyte in series in the plurality of hydrogen producing cells having a height difference between the hydrogen producing cells.

BRIEF DESCRIPTION OF DRAWINGS

FIG. 3 is a schematic view showing a configuration of a hydrogen producing device of first exemplary embodiment of the present disclosure.

FIG. 4 is a schematic view showing a configuration of a hydrogen producing device of second exemplary embodiment of the present disclosure.

DESCRIPTION OF EMBODIMENTS (Findings Underlying Disclosure)

Figure 1:
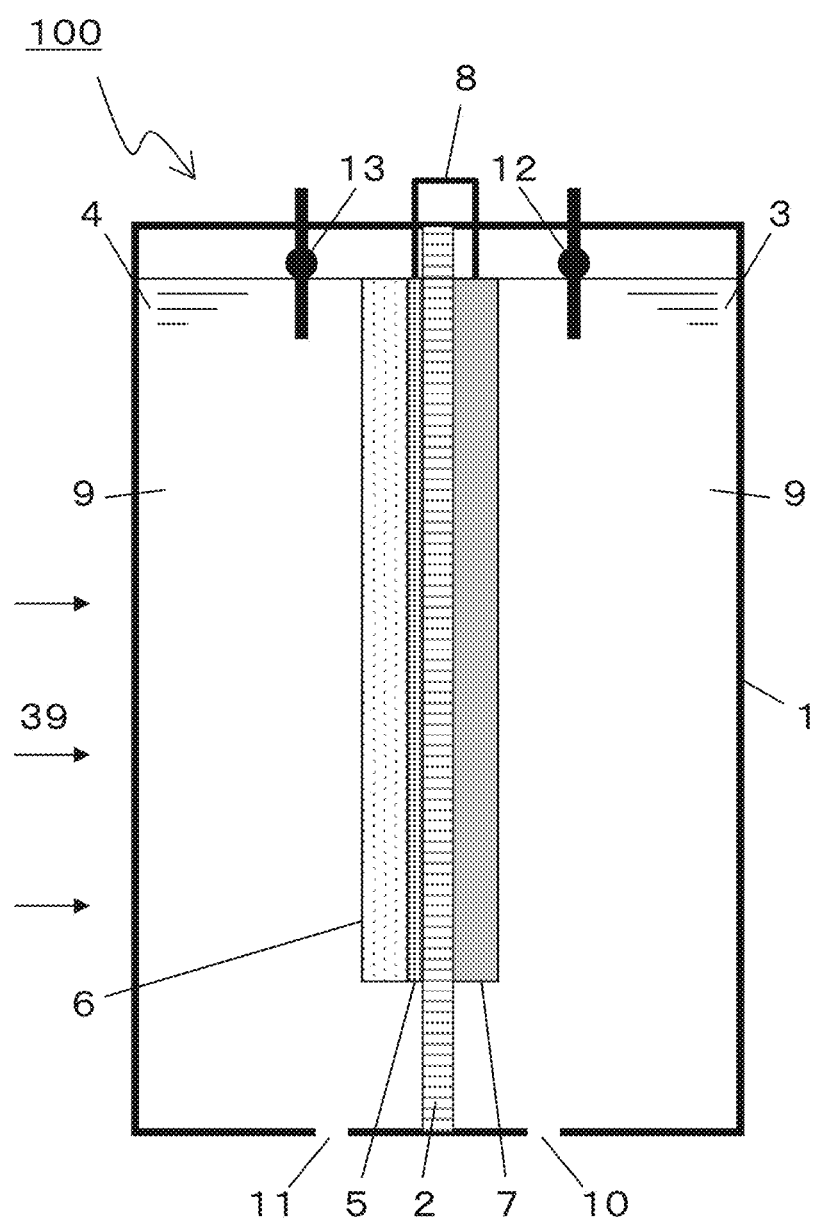
FIG. 1 is a schematic view showing a configuration of a hydrogen producing cell of first exemplary embodiment of the present disclosure.

In the case of the photo-assisted water electrolysis apparatus disclosed in PTL 1, a plurality of photo-assisted water electrolysis cells are arranged at positions having a height difference therebetween. Practically, it is inevitable to arrange a plurality of photo-assisted water electrolysis cells at positions having a height difference therebetween when a photo-assisted water electrolysis apparatus composed of the plurality of photo-assisted water electrolysis cells is arranged at a place. In other words, it is not realistic to arrange all photo-assisted water electrolysis cells in a line in a horizontal direction.

Then, in the photo-assisted water electrolysis apparatus of PTL 1, the electrolyte is supplied to each photo-assisted water electrolysis cell by admission through a circulation hole of the electrolyte having overflown from a neighboring photo-assisted water electrolysis cell located on an upstream side (side on which a position is higher). Similarly, the electrolyte is discharged from each photo-assisted water electrolysis cell by effusion through a circulation hole of the electrolyte having overflown from a photo-assisted water electrolysis cell to a neighboring photo-assisted water electrolysis cell located on downstream side (side on which a position is lower).

By employing such a mechanism, potential energy obtained by virtue of arranging photo-assisted water electrolysis cells located at positions having a height difference therebetween becomes a driving force, and the electrolyte flows through all photo-assisted water electrolysis cells in series.

However, in the case of the photo-assisted water electrolysis apparatus, in each photo-assisted water electrolysis cell, the space on the platinum counter electrode side is a space from which the electrolyte overflows, and the space on the photocatalyst electrode side is a space into which the electrolyte having overflown flows.

In other words, the electrolyte flows from a space on a hydrogen-generation side into a space on an oxygen-generation side through a circulation hole between neighboring photo-assisted water electrolysis cells. At this time, not only the electrolyte, but also hydrogen and oxygen produced in each photo-assisted water electrolysis cell move through a circulation hole, and therefore hydrogen is mixed with oxygen.

Further, in the same photo-assisted water electrolysis cell, a portion of oxygen bubbles produced at the surface of the photocatalyst electrode is swept away beyond the through hole by the electrolyte, and enters the space on the platinum counter electrode side (hydrogen production side).

That is, in the photo-assisted water electrolysis apparatus, it is not possible to collect hydrogen and oxygen separately because of the structure even though a location of hydrogen production is different from that of oxygen production.

When produced hydrogen and oxygen are mixed with each other, it is necessary to add a separation mechanism such as a hydrogen separation membrane in order to utilize hydrogen, and there is a problem of production and operation costs. Further, since a mixed gas of hydrogen and oxygen is extremely explosive, there is a problem of safety.

In order to solve the problem of mixing of hydrogen and oxygen, a method is conceivable such that over a plurality of photo-assisted water electrolysis cells arranged at different heights, an electrolyte flow path formed by connecting only spaces on the platinum counter electrode side in series is separated from an electrolyte flow path formed by connecting only spaces on the photocatalyst electrode side in series.

However, it doesn't mean that it is only necessary to simply connect the respective spaces in series. By the system of connection in series, another problem described below arises.

As one system of connection in series, in the photo-assisted water electrolysis apparatus disclosed in PTL 1, a flow path is conceived such that the electrolyte having overflown from the space on a platinum counter electrode side of each photo-assisted water electrolysis cell flows directly into the space on a platinum counter electrode side of a neighboring photo-assisted water electrolysis cell located on downstream side and falls to a liquid level of the electrolyte. The same manner is employed for the space on a photocatalyst electrode side. Accordingly, the problem of mixing of hydrogen and oxygen respectively produced is solved.

However, in the flow path, both admission and effusion of the electrolyte within the space take place in the vicinity of a liquid level of the electrolyte or at a position higher than the liquid level. Therefore, the flow of the electrolyte in the photo-assisted water electrolysis cell is limited to the vicinity of the liquid level of the electrolyte, and there is almost no flow of the electrolyte in the vicinity of the surface of the platinum counter electrode and that of the photocatalyst electrode respectively immersed in the electrolyte. Then, the produced hydrogen and oxygen bubbles keep on adhering to the electrode surface to cause polarization, and a new problem that hydrogen production efficiency deteriorates arises.

As another system of connection in series, a flow path is conceived such that a top surface of the space on the platinum counter electrode side of each photo-assisted water electrolysis cell is connected, by a circulation hole, with a bottom surface of a photo-assisted water electrolysis cell upwardly adjacent to the above-mentioned photo-assisted water electrolysis cell, and the electrolyte is swept away from a lower part to an upper part through the circulation hole. The same manner is employed for the space on the photocatalyst electrode side. Accordingly, the problem of mixing of hydrogen and oxygen respectively produced is solved.

Moreover, the flow of the electrolyte is generated in the vicinity of the surface of the platinum counter electrode and that of the photocatalyst electrode, and the produced hydrogen and oxygen bubbles are detached by the flow of the electrolyte, and therefore the problem of a reduction in hydrogen production efficiency due to polarization is solved.

However, in the flow path, the electrolytes in all photo-assisted water electrolysis cells are communicated with one another through the circulation hole. Then, some photo-assisted water electrolysis cells receive all of hydraulic pressure resulting from the electrolyte in a photo-assisted water electrolysis cell arranged at a position higher than the some photo-assisted water electrolysis cells. Accordingly, a need for changing the hydraulic pressure resistance design of each photo-assisted water electrolysis cell depending on the height of arrangement arises. This becomes a new problem in terms of practicality, production cost and complication in works.

Then, in view of the conventional problems, the present disclosure provides a hydrogen producing device and a hydrogen producing unit, which produces hydrogen by utilizing a decomposition reaction of water by an optical semiconductor, as well as an energy system including the hydrogen producing device and the hydrogen producing unit.

Specifically, the present disclosure provides a method of solving the problem of mixing of produced hydrogen and oxygen by arranging a plurality of hydrogen producing cells constituting the hydrogen producing device at positions having a height difference therebetween, and connecting the hydrogen producing cells to one another in series in relation to a flow of an electrolyte, and the present disclosure simultaneously provides a method of solving the problem of polarization and the hydraulic pressure of an electrolyte due to bubbles adhering to the surface of an electrode.

Further, in order to put the hydrogen producing device into practical use, the present disclosure provides a simple and rational connecting member between hydrogen producing cells for producing a sufficient amount of hydrogen by connecting a large number of hydrogen producing cells, and a connecting method.

The hydrogen producing device according to the present disclosure are composed of a plurality of hydrogen producing cells arranged at positions having a height difference therebetween, and connected to one another in series in relation to the flow of an electrolyte. Herein, when the electrolyte supply hole, the electrolyte supply pipe, the gas-liquid branch pipe, the electrolyte circulation pipe and the electrolyte recovery pipe are connected at positions described above, the following functions concerning the circulation of an electrolyte are achieved.

The electrolyte sent out from the electrolyte storage unit is first supplied from an electrolyte supply hole of the hydrogen producing cell arranged at the highest position into the housing through the electrolyte supply pipe. Next, the electrolyte having overflown from the gas-liquid branch pipe flows through the electrolyte circulation pipe by gravity as a driving force, and supplied from an electrolyte supply hole of a hydrogen producing cell downwardly adjacent to the hydrogen producing cell into the housing. By repeating this operation, supply and discharge of the electrolyte in all hydrogen producing cells are performed. Finally, the electrolyte having overflown from the gas-liquid branch pipe of the hydrogen producing cell arranged at the lowest position passes through the electrolyte recovery pipe and is recovered in the electrolyte storage unit.

When such an electrolyte flow path is disposed in a hydrogen producing side of the housing and an oxygen producing side of the housing separately, the problem of mixing of hydrogen and oxygen is solved.

Further, the electrolyte supply hole is disposed at a bottom portion of the housing and the gas-liquid branch pipe is disposed at an upper part of the housing, and therefore an upward flow of the electrolyte from the bottom is generated in the housing. By this flow of the electrolyte, the produced hydrogen and oxygen bubbles are detached by the flow of the electrolyte, and therefore the problem of a reduction in hydrogen production efficiency due to polarization is simultaneously solved.

Moreover, a produced gas is present at least at a portion in the gas-liquid branch pipe, and therefore the electrolyte hydraulic pressure in the hydrogen producing cell arranged at a high position is not transmitted to an electrolyte in a hydrogen producing cell arranged at a low position. Accordingly, the above-mentioned problem of hydraulic pressure, which takes place by communication of the electrolytes in the plurality of hydrogen producing cells, is simultaneously solved.

From the above-mentioned viewpoint, it can be said that the configuration of the present disclosure in which the plurality of hydrogen producing cells are arranged at positions having a height difference therebetween, and connected to one another in series in relation to the flow of an electrolyte is suitable for a hydrogen producing device.

Hereinafter, embodiments of the present disclosure will be described in detail with reference to drawings. The following exemplary embodiments are just examples, and the present disclosure is not limited to the following exemplary embodiments. In the following exemplary embodiments, the same members are indicated with identical reference marks and the redundant descriptions thereof may be omitted.

The following descriptions correspond to the case where an optical semiconductor electrode is an n-type semiconductor and present on a side where oxygen is produced, and a counter electrode is present on a side where hydrogen is produced. Therefore, the case where the optical semiconductor electrode is a p-type semiconductor will be described by interchanging hydrogen with oxygen in the above-mentioned descriptions for the case of an n-type semiconductor.

First Exemplary Embodiment

Figure 2:
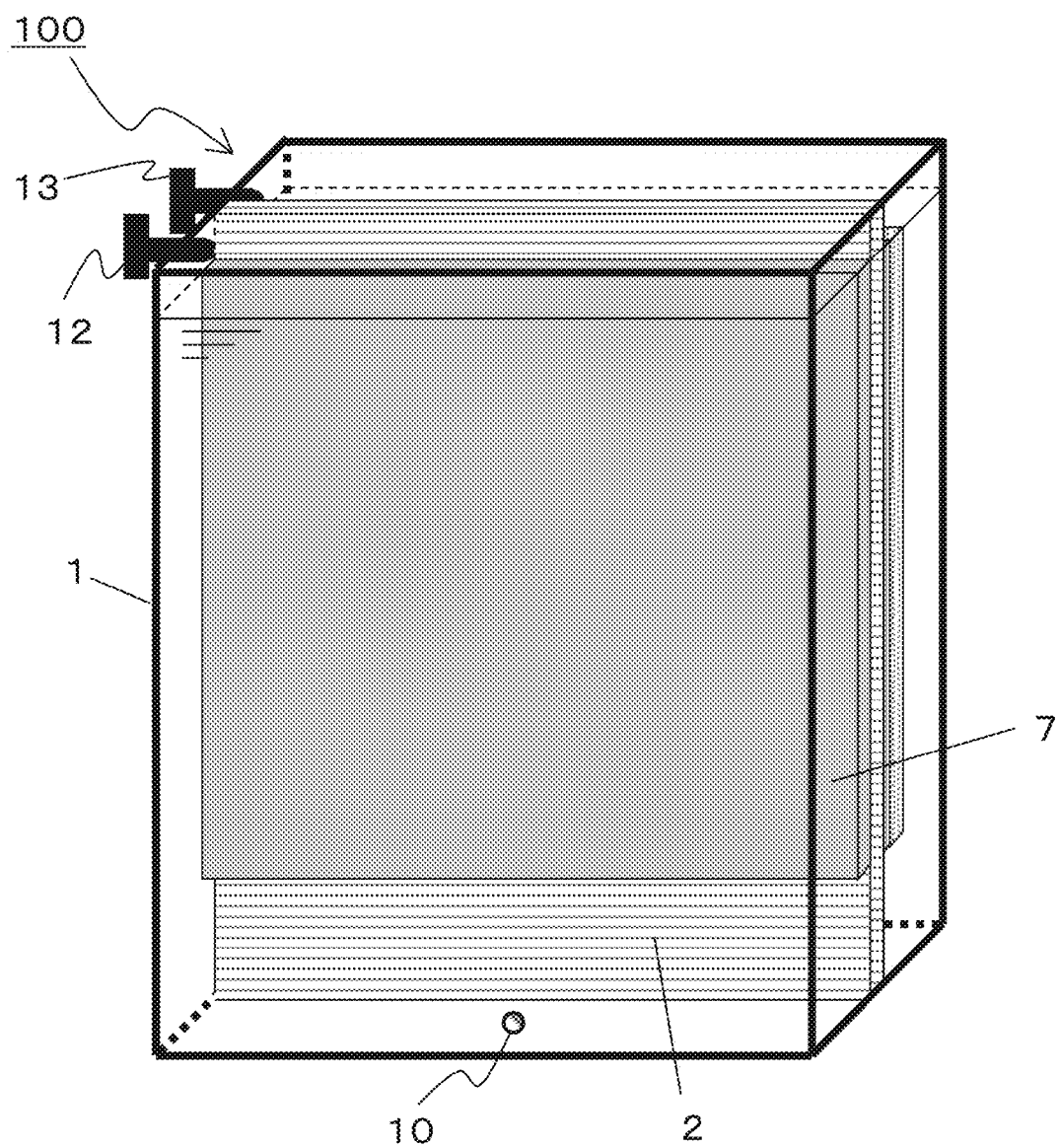
FIG. 2 is a schematic view of the configuration of the hydrogen producing cell of first exemplary embodiment of the present disclosure viewed from a hydrogen-side space.

A hydrogen producing device of first exemplary embodiment of the present disclosure will be described with reference to FIG. 1, FIG. 2 and FIG. 3. FIG. 1 is a schematic view showing a configuration of a hydrogen producing cell used in a hydrogen producing devise of the present exemplary embodiment, FIG. 2 is a schematic view of the configuration of the hydrogen producing cell used in the hydrogen producing devise of the present exemplary embodiment viewed from a hydrogen-side space, and FIG. 3 is a schematic view showing a configuration of a hydrogen producing devise of the present exemplary embodiment.

Hydrogen producing cell 100 of the present exemplary embodiment has housing 1 whose surface irradiated with irradiation light 39, at least, has a light-transmitting property. Separator 2 is disposed in a direction substantially parallel to the surface of housing 1 irradiated with irradiation light 39 so as to divide a space within housing 1 into two. Hydrogen-side space 3 and oxygen-side space 4 separated by separator 2, and conductive substrate 5 directed in a direction substantially parallel to the surface of housing 1 irradiated with irradiation light 39 in oxygen-side space 4 are disposed. Optical semiconductor electrode 6 is formed on conductive substrate 5. Counter electrode 7 is disposed in hydrogen-side space 3. Electrical connection part 8 electrically connects conductive substrate 5 with counter electrode 7. Electrolyte 9 containing water is present in both of hydrogen-side space 3 and oxygen-side space 4.

Describing the present disclosure along a traveling direction of irradiation light 39 incident on hydrogen producing cell 100, in hydrogen producing cell 100, one surface of housing 1 having a light-transmitting property, electrolyte 9, optical semiconductor electrode 6, conductive substrate 5, separator 2, counter electrode 7, electrolyte 9, and the other surface of housing 1 are arranged in this order from a side irradiated with irradiation light 39. Conductive substrate 5 may be in contact with separator 2 or apart from separator 2. Counter electrode 7 may be in contact with separator 2 or apart from separator 2. Separator 2 plays a role of exchanging ions between electrolyte 9 in hydrogen-side space 3 and electrolyte 9 in oxygen-side space 4. Therefore, at least a part of separator 2 is in contact with electrolyte 9 in hydrogen-side space 3 and oxygen-side space 4.

Hydrogen-side electrolyte supply hole 10 is disposed in hydrogen-side space 3 so as to penetrate a bottom of housing 1 on hydrogen-side space 3 side and oxygen-side electrolyte supply hole 11 is disposed in oxygen-side space 4 so as to penetrate a bottom of housing 1 on oxygen-side space 4 side. Herein, hydrogen-side electrolyte supply hole 10 and oxygen-side electrolyte supply hole 11 are preferably disposed at the bottom portion of housing 1; however, these holes may be disposed, for example, at a lower part of housing 1 in a side surface if an upward flow of the electrolyte from the bottom are generated in hydrogen-side space 3 and oxygen-side space 4, and hydrogen and oxygen bubbles produced at the surfaces of counter electrode 7 and optical semiconductor electrode 6 are detached.

In order that in hydrogen-side space 3, hydrogen is efficiently separated from the electrolyte and in oxygen-side space 4, oxygen is efficiently separated from the electrolyte, hydrogen-side gas-liquid branch pipe 12 is disposed in hydrogen-side space 3, and oxygen-side gas-liquid branch pipe 13 is disposed in oxygen-side space 4. Hydrogen-side gas-liquid branch pipe 12 and oxygen-side gas-liquid branch pipe 13 are branched to three directions of a lateral direction, an upper direction and a descent direction, and branch destinations serve as a gas-liquid introduction port, a gas discharge port and a liquid discharge port. One end (gas-liquid introduction port) of hydrogen-side gas-liquid branch pipe 12 in a lateral direction is disposed so as to penetrate housing 1 on hydrogen-side space 3 side and one end (gas-liquid introduction port) of oxygen-side gas-liquid branch pipe 13 in a lateral direction is disposed so as to penetrate housing 1 on oxygen-side space 4 side. At this time, a connection point between hydrogen-side gas-liquid branch pipe 12 and housing 1 is arranged so as to be higher than an uppermost portion of counter electrode 7 and a connection point between oxygen-side gas-liquid branch pipe 13 and housing 1 is arranged so as to be higher than an uppermost portion of optical semiconductor electrode 6.

Next, each constituent component of hydrogen producing cell 100 will be specifically described.

For a surface of housing 1 irradiated with irradiation light 39, a material having corrosion resistance to electrolyte 9 and an insulating property and transmitting light in a visible light region, more preferably light including wavelengths around a visible light region is used. Examples of the material include glass and resins. Materials of other surfaces of housing 1 have only to have corrosion resistance to electrolyte 9 and an insulating property, and do not need to have a property of transmitting light. As the material, metals subjected to surface treatment for corrosion resistance/insulation can be used in addition to glass and resins described above.

Separator 2 has a function to permeate an electrolytic substance in electrolyte 9 therethrough and suppress permeation of hydrogen and oxygen in electrolyte 9. Examples of a material of separator 2 include solid electrolytes such as solid polymer electrolytes. Examples of solid polymer electrolytes include ion-exchange membranes such as Nafion.

For conductive substrate 5, a substrate having a conductive property, or a substrate having a film formed of a material having a conductive property on the surface thereof is used. Examples of conductive substrate 5 include a platinum plate, indium tin oxide (ITO) glass, and a fluorine-doped tin oxide (FTO) glass.

Optical semiconductor electrode 6 is formed of an n-type semiconductor or a p-type semiconductor. When optical semiconductor electrode 6 is formed of an n-type semiconductor, oxygen is produced from optical semiconductor electrode 6 and hydrogen is produced from counter electrode 7. On the contrarily, when optical semiconductor electrode 6 is a p-type semiconductor, hydrogen is produced from optical semiconductor electrode 6 and oxygen is produced from counter electrode 7. In optical semiconductor electrode 6, it is necessary that electrons are excited by light irradiation to decompose water. Thus, optical semiconductor electrode 6 is preferably formed of a semiconductor in which the band edge level of a conduction band is 0 eV (vs. NHE), which is a standard reduction potential of hydrogen ions, or less, and the band edge level of a valence band is 1.23 eV (vs. NHE), which is a standard oxidation potential of water, or more. Preferred examples of such semiconductors include oxides, oxynitrides and nitrides of titanium, zirconium, vanadium, tantalum, niobium, tungsten, iron, copper, zinc, cadmium, gallium, indium and germanium; composite oxides, composite oxynitrides and composite nitrides thereof; and substances formed by adding alkali metal ions or alkaline-earth metal ions to these compounds. Laminated membranes formed by joining together a membrane made of a material in which the band edge level of a conduction band is 0 eV (vs. NHE), which is a standard reduction potential of hydrogen ions, or less, and a membrane made of a material in which the band edge level of a valence band is 1.23 eV (vs. NHE), which is a standard oxidation potential of water, or more are also effectively used. As an example, a $WO_3$/ITO/Si laminated membrane is suitably used.

As counter electrode 7, employed is a material having conductivity, and having activity for a hydrogen producing reaction when optical semiconductor electrode 6 is an n-type semiconductor and having activity for an oxygen producing reaction when optical semiconductor electrode 6 is a p-type semiconductor. Examples of counter electrode 7 material include carbon and noble metals that are commonly used as an electrode for electrolysis of water. Specifically, carbon, platinum, platinum-supported carbon, palladium, iridium, ruthenium and nickel can be employed.

Common metal wires can be used for electrical connection part 8.

Electrolyte 9 put in hydrogen-side space 3 and oxygen-side space 4 have only to be an electrolyte containing water, and may be acidic, neutral or basic. For example, sulfuric acid, hydrochloric acid, potassium chloride, sodium chloride, potassium sulfate, sodium sulfate, sodium hydrogen carbonate, or sodium hydroxide can be suitably used.

A material having corrosion resistance to electrolyte 9 and an insulating property is used for hydrogen-side electrolyte supply hole 10 and oxygen-side electrolyte supply hole 11.

The material used for hydrogen-side gas-liquid branch pipe 12 and oxygen-side gas-liquid branch pipe 13 is a material having corrosion resistance to electrolyte 9 and an insulating property and having a function that it does not allow permeation of hydrogen or oxygen therethrough and does not adsorb hydrogen or oxygen in atmospheric pressure or less. Specifically, glass, resins, or metals subjected to surface treatment for corrosion resistance/insulation can be used.

Next, the actions of hydrogen producing cell 100 will be described.

In hydrogen producing cell 100, light transmitted housing 1 and then electrolyte 9 put in oxygen-side space 4 enters optical semiconductor electrode 6. Optical semiconductor electrode 6 absorbs light and photoexcitation of electrons occurs to produce electrons in a conduction band and holes in a valence band in optical semiconductor electrode 6. At this time, since band bending takes place in the vicinity of the surface (interface with electrolyte 9) of optical semiconductor electrode 6 by the contact between optical semiconductor electrode 6 and electrolyte 9, the holes produced by light irradiation move to the surface (interface with electrolyte 9) side of optical semiconductor electrode 6 according to the band bending. The holes oxidize water molecules at the surface of optical semiconductor electrode 6 to produce oxygen (following chemical formula (1)).

On the other hand, electrons produced in the conduction band move to conductive substrate 5 side. The electrons having moved to conductive substrate 5 side move to counter electrode 7 side through electrical connection part 8. The electrons having moved within counter electrode 7 and reached the surface (interface with electrolyte 9) of counter electrode 7 reduce protons at the surface of counter electrode 7 to produce hydrogen (following chemical formula (2)).

$$4h^+ + 2H_2O \rightarrow O_2\uparrow + 4H^+ \quad (1)$$

$$4e^- + 4H+ \rightarrow 2H_2\uparrow \quad (2)$$

Hydrogen bubbles produced at the surface of counter electrode 7 rise in electrolyte 9 put in hydrogen-side space 3 and reach above the liquid level of electrolyte 9. Thereafter, the hydrogen moves to the outside of hydrogen producing cell 100 through hydrogen-side gas-liquid branch pipe 12.

On the other hand, oxygen bubbles produced at the surface of optical semiconductor electrode 6 rise in electrolyte 9 put in oxygen-side space 4 and reach above the liquid level of electrolyte 9. Thereafter, the oxygen moves to the outside of hydrogen producing cell 100 through oxygen-side gas-liquid branch pipe 13.

The amount of electrolyte 9 is reduced as production of hydrogen and oxygen by photodecomposition of water proceeds. In order to replenish reduced electrolyte 9, a required amount of electrolyte is supplied from hydrogen-side electrolyte supply hole 10 to hydrogen-side space 3 and from oxygen-side electrolyte supply hole 11 to oxygen-side space 4, respectively. When the electrolyte is excessively supplied to make a flow of the electrolyte in the vicinity of the surfaces of both electrodes, hydrogen bubbles and oxygen bubbles adhering to surfaces of counter electrode 7 and optical semiconductor electrode 6 can be detached. When the liquid level of electrolyte 9 rises above the connection point between hydrogen-side gas-liquid branch pipe 12 or oxygen-side gas-liquid branch pipe 13 and housing 1 by supply of electrolyte 9, the electrolyte is spontaneously discharged from hydrogen-side gas-liquid branch pipe 12 or oxygen-side gas-liquid branch pipe 13 with gravity.

Hydrogen producing device 300 of the present exemplary embodiment is composed of a plurality of hydrogen producing cells 310. A constitution of hydrogen producing cell 310 is the same as in hydrogen producing cell 100 previously described in the present exemplary embodiment.

In order to circulate the electrolyte to the plurality of hydrogen producing cells 310, electrolyte storage unit 14 having a function of supplying out and recovering the electrolyte is disposed.

Hydrogen-side electrolyte supply pipe 15 and oxygen-side electrolyte supply pipe 16 extend from electrolyte storage unit 14, and tip ends of these supply pipes are respectively connected to hydrogen-side electrolyte supply hole 10 and oxygen-side electrolyte supply hole 11 of hydrogen producing cell 310 arranged at the highest position.

Hydrogen-side electrolyte circulation pipe 17 and oxygen-side electrolyte circulation pipe 18 respectively extend from one end directed downward (liquid discharge port) out of hydrogen-side gas-liquid branch pipe 12 and oxygen-side gas-liquid branch pipe 13 of each of hydrogen producing cells 310 excluding the hydrogen producing cell arranged at the lowest position, and hydrogen-side electrolyte circulation pipe 17 and oxygen-side electrolyte circulation pipe 18 are respectively connected to hydrogen-side electrolyte supply hole 10 and oxygen-side electrolyte supply hole 11 of hydrogen producing cell 310 downwardly adjacent to hydrogen producing cell 310.

Hydrogen-side electrolyte recovery pipe 19 and oxygen-side electrolyte recovery pipe 20 respectively extend from one end directed downward (liquid discharge port) out of hydrogen-side gas-liquid branch pipe 12 and oxygen-side gas-liquid branch pipe 13 of hydrogen producing cell 310 arranged at the lowest position, and these recovery pipes are respectively connected to electrolyte storage unit 14.

Moreover, hydrogen storage unit 21 is disposed in order to collect and store hydrogen produced in the plurality of hydrogen producing cells 310.

Hydrogen collecting pipe 22 extends from one end directed upward (gas discharge port) out of hydrogen-side gas-liquid branch pipe 12 of hydrogen producing cell 310 arranged at the highest position, and is connected to hydrogen storage unit 21.

Hydrogen circulation pipe 23 extends from one end directed upward (gas discharge port) out of hydrogen-side gas-liquid branch pipe 12 of each of hydrogen producing cells 310 excluding the hydrogen producing cell arranged at the highest position, and hydrogen circulation pipe 23 is connected to a pathway of hydrogen circulation pipe 23 or a pathway of hydrogen collecting pipe 22 of hydrogen producing cell 310 upwardly adjacent to hydrogen producing cell 310.

Electrolyte storage unit 14, hydrogen-side electrolyte supply pipe 15, oxygen-side electrolyte supply pipe 16, hydrogen-side electrolyte circulation pipe 17, oxygen-side electrolyte circulation pipe 18, hydrogen-side electrolyte recovery pipe 19 and oxygen-side electrolyte recovery pipe 20 are formed of a material having corrosion resistance to the electrolyte. For example, glass, resins, or metals subjected to surface treatment for corrosion resistance/insulation can be used.

In electrolyte storage unit 14, a mechanism for supplying water and an electrolytic substance into the electrolyte storage unit is provided so that the electrolyte concentration can be appropriately adjusted. Further, a mechanism for sending out a required amount of electrolyte to hydrogen-side electrolyte supply pipe 15 and oxygen-side electrolyte supply pipe 16, and a mechanism for recovering an electrolyte from hydrogen-side electrolyte recovery pipe 19 and oxygen-side electrolyte recovery pipe 20 are provided.

In addition, an example in which electrolyte storage unit 14 is disposed at the lowest position is shown in FIG. 3; however, a height at which electrolyte storage unit 14 is disposed may be appropriately determined as long as an electrolyte can be circulated in a whole hydrogen producing device 300.

Hydrogen storage unit 21, hydrogen collecting pipe 22 and hydrogen circulation pipe 23 are formed of a material having a function that it does not allow permeation of hydrogen therethrough and does not adsorb hydrogen in atmospheric pressure or less. For example, glass, resins, or metals can be used.

Hydrogen storage unit 21 has a function of taking in a required amount of hydrogen from hydrogen collecting pipe 22 and storing the hydrogen.

Next, the action of hydrogen producing device 300 will be described. Of the action of hydrogen producing device 300, the action of each hydrogen producing cell 310 constituting hydrogen producing device 300 is the same as that of hydrogen producing cell 100 previously described in the present exemplary embodiment. Therefore, herein, the description of the action of each hydrogen producing cell will be omitted.

When electrolyte storage unit 14 is actuated, a required amount of electrolyte stored in electrolyte storage unit 14 passes through hydrogen-side electrolyte supply pipe 15 and oxygen-side electrolyte supply pipe 16, respectively, and is supplied first from hydrogen-side electrolyte supply hole 10 and oxygen-side electrolyte supply hole 11 of hydrogen producing cell 310 arranged at the highest position into hydrogen-side space 3 and oxygen-side space 4 of housing 1, respectively. Next, the electrolyte discharged from hydrogen-side gas-liquid branch pipe 12 and the electrolyte discharged from oxygen-side gas-liquid branch pipe 13 flow through hydrogen-side electrolyte circulation pipe 17 and oxygen-side electrolyte circulation pipe 18, respectively, by gravity as a driving force, and supplied from hydrogen-side electrolyte supply hole 10 and oxygen-side electrolyte supply hole 11 of a hydrogen producing cell downwardly adjacent to hydrogen producing cell 310 into a housing. By repeating this action, supply and discharge of the electrolyte in all hydrogen producing cells are performed. Finally, the electrolytes having overflown from hydrogen-side gas-liquid branch pipe 12 and oxygen-side gas-liquid branch pipe 13 of the hydrogen producing cell arranged at the lowest position pass through hydrogen-side electrolyte recovery pipe 19 and oxygen-side electrolyte recovery pipe 20, respectively, and is recovered in electrolyte storage unit 14.

At this time, in all hydrogen producing cells 310, electrolyte storage unit 14 adjusts a supply flow rate of an electrolyte so that the electrolyte is prevented from overflowing hydrogen-side gas-liquid branch pipe 12 and oxygen-side gas-liquid branch pipe 13 of the hydrogen producing cell, and simultaneously so that a flow velocity of an electrolyte sufficient for detaching hydrogen bubbles and oxygen bubbles adhering to surfaces of counter electrode 7 and optical semiconductor electrode 6 is ensured.

In hydrogen producing device 300, since the amount of the electrolyte is reduced by the portion of water decomposed by light irradiation, water and an electrolyte are appropriately replenished to electrolyte storage unit 14.

Thereby, the concentration of electrolyte 9 in hydrogen producing cell 310 is kept constant.

When hydrogen producing cell 310 is not irradiated with light at night or the like, the action of hydrogen producing device 300 can be appropriately stopped. In association with this, the action of electrolyte storage unit 14 can also be stopped.

Hydrogen, which has been produced in each hydrogen producing cell 310 by light irradiation and has moved out of the hydrogen producing cell through hydrogen-side gas-liquid branch pipe 12, flows through hydrogen circulation pipe 23 and is joined to hydrogen circulation pipe 23 of a hydrogen producing cell upwardly adjacent to this hydrogen producing cell. By repeating this action, hydrogen produced in all hydrogen producing cells gathers in hydrogen collecting pipe 22. Hydrogen in hydrogen collecting pipe 22 flows into hydrogen storage unit 21 by actuation of hydrogen storage unit 21, and is stored therein.

According to the above-mentioned results, it is possible to collect hydrogen produced in the hydrogen producing device having a configuration in which a plurality of hydrogen producing cells are arranged at positions having a height difference therebetween, and connected to one another in series in relation to a flow of an electrolyte. This facilitates the execution of work on the roofs of buildings or hydrogen stations, and improves practicality.

Second Exemplary Embodiment

Figure 5A:
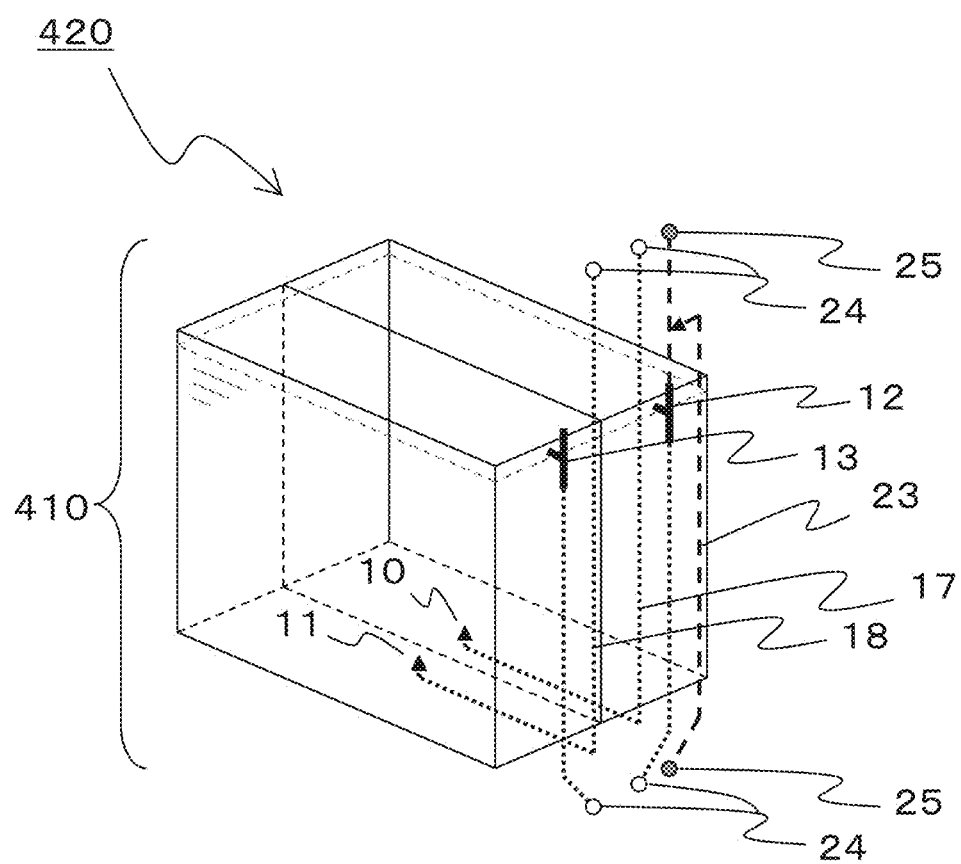
FIG. 5A is a schematic view showing a configuration of a hydrogen producing unit of second exemplary embodiment of the present disclosure.

A hydrogen producing device of second exemplary embodiment of the present disclosure will be described with reference to FIG. 4 and FIG. 5A. FIG. 4 is a schematic view showing a hydrogen producing device of the present second exemplary embodiment, and FIG. 5A is a schematic view showing a hydrogen producing unit of the present second exemplary embodiment.

Hydrogen producing device 400 of the present exemplary embodiment has the same configuration as in hydrogen producing device 300 of first exemplary embodiment except that hydrogen producing unit 420 integrally formed by hydrogen producing cell 410, hydrogen-side electrolyte circulation pipe 17, oxygen-side electrolyte circulation pipe 18 and hydrogen circulation pipe 23 is formed and that joint 24 and joint 25 are added. Therefore, herein, only a configuration and joints of this hydrogen producing unit 420, and a connecting mechanism of hydrogen producing units will be described.

Hydrogen producing device 400 of the present exemplary embodiment is composed of a plurality of hydrogen producing units 420.

A configuration of hydrogen producing cell 410 constituting hydrogen producing unit 420 is the same as in hydrogen producing cell 100 in first embodiment. Further, hydrogen-side electrolyte circulation pipe 17 and oxygen-side electrolyte circulation pipe 18 in a section from hydrogen-side electrolyte supply hole 10 and oxygen-side electrolyte supply hole 11 to joints 24 (details will be described later) of each hydrogen producing cell 410 are also included in hydrogen producing unit 420. Moreover, hydrogen-side electrolyte circulation pipe 17 and oxygen-side electrolyte circulation pipe 18 in a section from hydrogen-side gas-liquid branch pipe 12 and oxygen-side gas-liquid branch pipe 13 to joints 24 of each hydrogen producing cell 410 are also included in hydrogen producing unit 420. In addition to this, hydrogen circulation pipe 23 in a section from hydrogen-side gas-liquid branch pipe 12 to joint 25 of each hydrogen producing cell 410 is also included in hydrogen producing unit 420, and hydrogen circulation pipe 23 in a section from the joint point to joint 25 within the above-mentioned section is also included in hydrogen producing unit 420 excluding a hydrogen producing unit arranged at the lowest position.

In hydrogen producing unit 420, joint 24 and joint 25 are provided as shown below.

Each of hydrogen-side electrolyte circulation pipe 17 and oxygen-side electrolyte circulation pipe 18 are respectively divided into two sections, and joints 24, which are simply connected with each other, are respectively provided for both ends of the divided portion. Out of the two divided sections, sections respectively connected to hydrogen-side electrolyte supply hole 10 and oxygen-side electrolyte supply hole 11 of each hydrogen producing cell 410 are allocated to hydrogen producing unit 420 including hydrogen producing cell 410. The remaining sections are allocated to hydrogen producing unit 420 including a hydrogen producing cell upwardly adjacent to this hydrogen producing cell.

Joints 24 have only to be those which are composed of a material having corrosion resistance to the electrolyte and an insulating property, and are a mechanism that does not cause the electrolyte leakage. For example, rubbers, resins, or metals subjected to surface treatment for corrosion resistance/insulation can be used.

Each hydrogen circulation pipe 23 is divided into two sections, and joints 25, which are simply connected with each other, are provided for both ends of the divided portion. Out of the two divided sections, a section connected to hydrogen-side gas-liquid branch pipe 12 of each hydrogen producing cell 410 is allocated to hydrogen producing unit 420 including this hydrogen producing cell. The remaining section is allocated to hydrogen producing unit 420 including a hydrogen producing cell upwardly adjacent to this hydrogen producing cell. However, hydrogen producing unit 420 arranged at the lowest position has only the former section.

Joints 25 have only to be those which are composed of a material having a function that it does not allow permeation of hydrogen therethrough and does not adsorb hydrogen in atmospheric pressure or less, and is a mechanism that does not cause hydrogen leakage. For example, rubbers, resins, or metals can be used.

Hydrogen-side electrolyte supply pipe 15 and oxygen-side electrolyte supply pipe 16 are respectively divided into two sections, and joints 24, which are simply connected with each other, are respectively provided for both ends of the divided portion. Out of the two divided sections, sections respectively connected to hydrogen-side electrolyte supply hole 10 and oxygen-side electrolyte supply hole 11 of hydrogen producing cell 410 arranged at the highest position are allocated to hydrogen producing unit 420 including this hydrogen producing cell. The remaining sections are newly used as hydrogen-side electrolyte supply pipe 26 and oxygen-side electrolyte supply pipe 27.

Hydrogen-side electrolyte recovery pipe 19 and oxygen-side electrolyte recovery pipe 20 are respectively divided into two sections, and joints 24, which are simply connected with each other, are respectively provided for both ends of the divided portion. Out of the two divided sections, sections respectively connected to hydrogen-side gas-liquid branch pipe 12 and oxygen-side gas-liquid branch pipe 13 of hydrogen producing cell 410 arranged at the lowest position are allocated to hydrogen producing unit 420 including this hydrogen producing cell. The remaining sections are newly used as hydrogen-side electrolyte recovery pipe 28 and oxygen-side electrolyte recovery pipe 29.

Hydrogen collecting pipe 22 is divided into two sections, and joints 25, which are simply connected with each other, are provided for both ends of the divided portion. Out of the two divided sections, a section connected to hydrogen-side gas-liquid branch pipe 12 of hydrogen producing cell 410 arranged at the highest position is allocated to hydrogen producing unit 420 including this hydrogen producing cell. The remaining section is newly used as hydrogen collecting pipe 30.

Thereby, the completely same two hydrogen producing units 420 can be connected to each other by joints 24 and joints 25. Hydrogen producing devices 400 can be sequentially linked with one another only by preparing a plurality of hydrogen producing units 420 and repeatedly connecting the units.

In a conventional photo-assisted water electrolysis apparatus, it is necessary to attach a hydrogen collecting pipe to each of photo-assisted water electrolysis cells to be arranged, and therefore the photo-assisted water electrolysis apparatus has problems that the configuration is complicated and the length of the hydrogen collecting pipe is significantly long, and that man-hours required for disposing pipes increase. However, by employing the configuration of hydrogen producing device 400 of the present disclosure, the length of a pipe for collecting hydrogen can be considerably reduced to solve the problems described above. Further, it is possible to perform the linkage of a large number of hydrogen producing cells simply and rationally.

The action of hydrogen producing device 400 is the same as in hydrogen producing device 300 in first exemplary embodiment, and thus the description thereof is omitted.

Figure 5B:
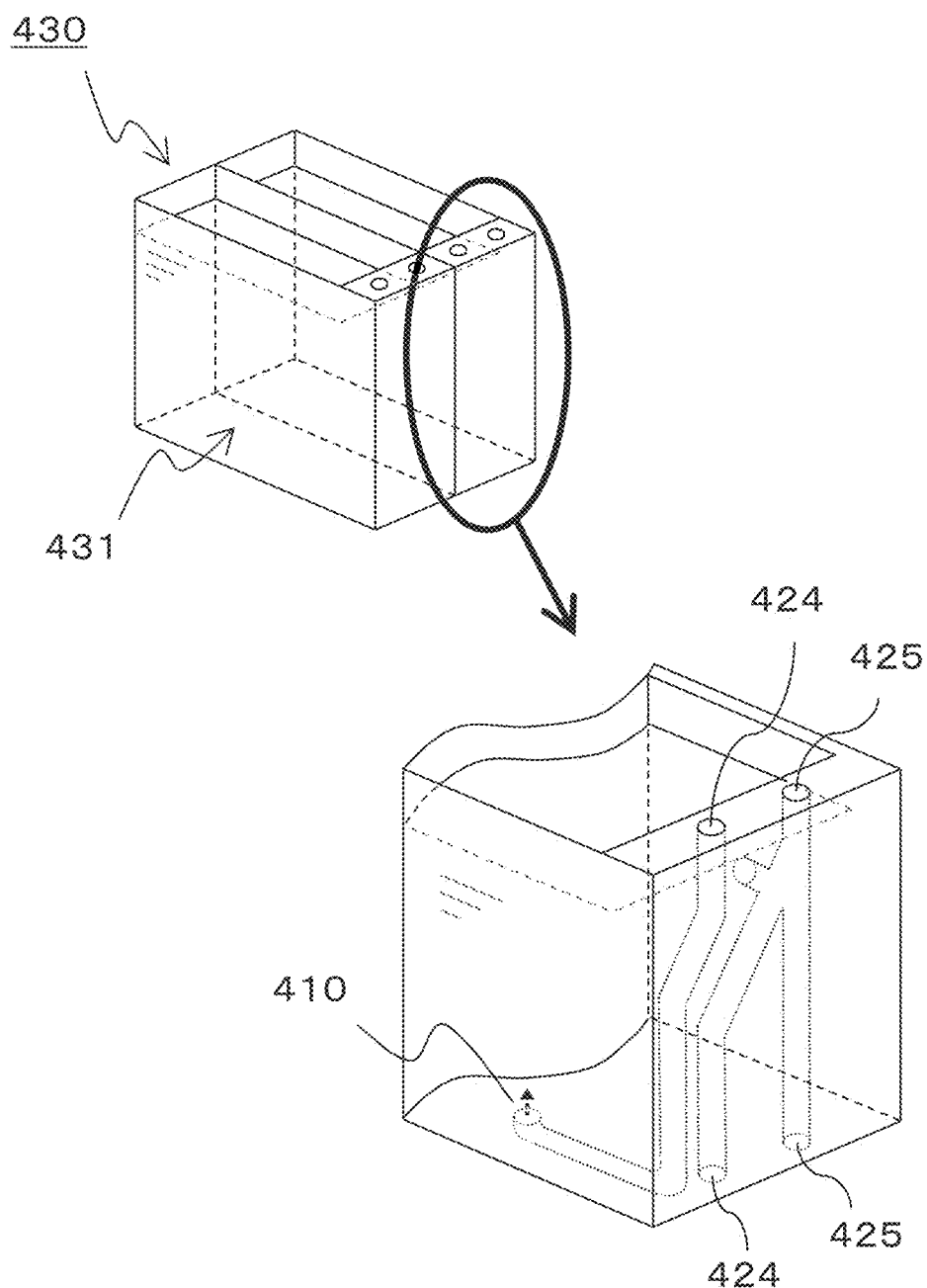
FIG. 5B is a schematic view showing another configuration of a hydrogen producing unit of second exemplary embodiment of the present disclosure.

Further, a hydrogen producing unit used in the hydrogen producing device of the present exemplary embodiment may have another configuration like a hydrogen producing unit shown in FIG. 5B. FIG. 5B is a view showing hydrogen producing unit 430 having another configuration of the present exemplary embodiment and an enlarged view showing an internal structure of a portion of hydrogen producing unit 430.

Hydrogen producing unit 430 is configured by previously forming as a portion of the housing of hydrogen producing unit 430, by integrated molding or the like, a configuration corresponding hydrogen-side electrolyte supply hole 10 and oxygen-side electrolyte supply hole 11, a configuration corresponding hydrogen-side electrolyte circulation pipe 17 and oxygen-side electrolyte circulation pipe 18, and a configuration corresponding hydrogen-side gas-liquid branch pipe 12 and oxygen-side gas-liquid branch pipe 13 in hydrogen producing unit 420. Moreover, as required, a configuration corresponding hydrogen-side electrolyte circulation pipe 17 or oxygen-side electrolyte circulation pipe 18 may be similarly formed as a portion of housing 431 by integrated molding or the like.

Since connection holes 424 and 425 are disposed at the same locations at both of a top surface and a bottom surface of each hydrogen producing unit 430, the hydrogen producing device of the present exemplary embodiment can be configured only by stacking a plurality of hydrogen producing units 430.

That is, as with hydrogen producing device 400, since there is no need to externally add hydrogen-side electrolyte circulation pipe 17 or oxygen-side electrolyte circulation pipe 18, the hydrogen producing device of the present exemplary embodiment can be simply configured.

In previous exemplary embodiments of the present disclosure, the cases where all of the plurality of hydrogen producing cells are connected with one another between the hydrogen producing cells vertically adjacent to each other have been described; however, the present exemplary embodiment is not limited to these cases. For example, when any two or more hydrogen producing cells including cells not adjacent to each other (plural hydrogen producing cells to be connected), out of the plurality of hydrogen producing cells disposed at positions having a height difference therebetween, are connected to one another so as to have the above-mentioned mutual positional relations, the effect of the present exemplary embodiment is exerted.

Third Exemplary Embodiment

Figure 6:
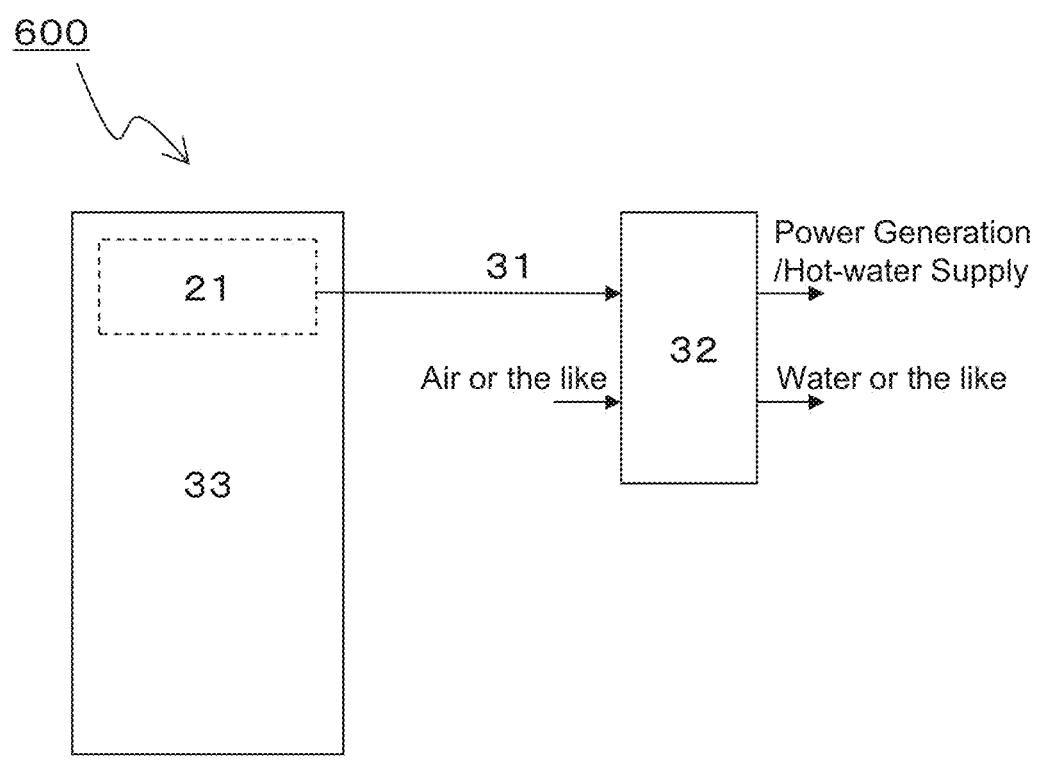
FIG. 6 is a schematic view showing a configuration of an energy system of third exemplary embodiment of the present disclosure.

An energy system of third exemplary embodiment of the present disclosure will be described with reference to FIG. 6. FIG. 6 is a schematic view showing a configuration of an energy system of the present third exemplary embodiment.

In energy system 600 of the present exemplary embodiment, in addition to hydrogen producing device 33 having the same configuration as that of hydrogen producing device 300 of first exemplary embodiment, hydrogen supply pipe 31 and fuel cell 32 are disposed.

Of energy system 600 of the present exemplary embodiment, the material and configuration of hydrogen producing device 33 are the same as those in hydrogen producing device 300 described in first exemplary embodiment, and thus the descriptions thereof are omitted, and only portions concerning hydrogen supply pipe 31 and fuel cell 32 will be described.

Hydrogen supply pipe 31 is disposed so as to be connected to hydrogen storage unit 21 at one end and to be connected to fuel cell 32 at the other end.

Hydrogen supply pipe 31 is formed of a material having a function that it does not allow permeation of hydrogen therethrough and does not adsorb hydrogen in atmospheric pressure or less. For example, glass, resins, or metals can be used.

Hydrogen storage unit 21 has a function of flowing out a required amount of hydrogen of the stored hydrogen to hydrogen supply pipe 31.

As fuel cell 32, a common fuel cell using hydrogen as a negative electrode active material can be employed. For example, solid polymer fuel cells, phosphate fuel cells, molten carbonate fuel cells, solid oxide fuel cells, alkaline electrolyte fuel cells and the like can be used.

Next, the action of energy system 600 will be described. Of the action of energy system 600, the action of hydrogen producing device 33 is the same as that of hydrogen producing device 300 described in first exemplary embodiment, and thus the description thereof is omitted, and only the actions concerning hydrogen supply pipe 31 and fuel cell 32 will be described.

The hydrogen stored in hydrogen storage unit 21 of hydrogen producing device 33 once is sent out from hydrogen storage unit 21, passes through hydrogen supply pipe 31 and is supplied to fuel cell 32 in accordance with the operating state of fuel cell 32. Gases containing a positive electrode active material, for example, air, beside hydrogen are sent to fuel cell 32, and power generation and hot-water supply are performed in fuel cell 32. Consumed hydrogen is discharged from fuel cell 32 as water or the like.

By the configuration described above, there is provided an energy system which can convert light energy of irradiation light to hydrogen energy in hydrogen producing device 33 and further can convert as required the energy to electrical energy in fuel cell 32.

Fourth Exemplary Embodiment

Figure 7:
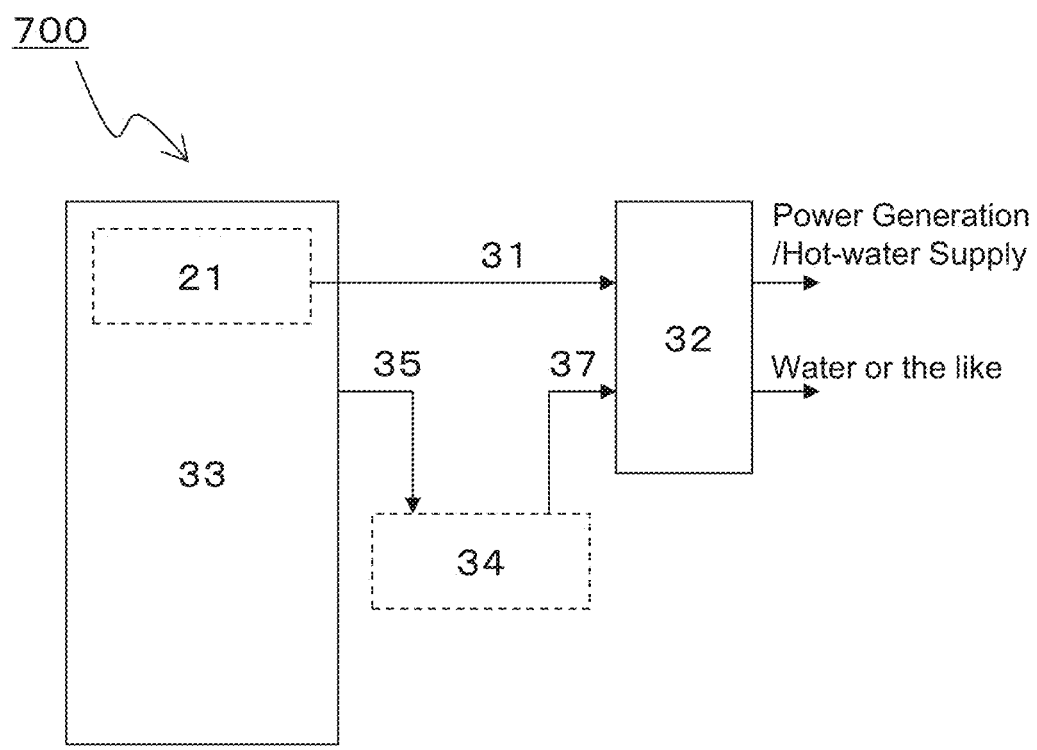
FIG. 7 is a schematic view showing a configuration of an energy system of fourth exemplary embodiment of the present disclosure.

An energy system of fourth exemplary embodiment of the present disclosure will be described with reference to FIG. 7. FIG. 7 is a schematic view showing a configuration of an energy system of the present exemplary embodiment.

In energy system 700 of the present exemplary embodiment, in addition to hydrogen producing device 33 having the same configuration as that of hydrogen producing device 300 of first exemplary embodiment, hydrogen supply pipe 31 and fuel cell 32, oxygen storage unit 34, oxygen collecting pipe 35, oxygen circulation pipe 36 (not shown) and oxygen supply pipe 37 are disposed.

Of energy system 700 of the present exemplary embodiment, the materials and configurations of hydrogen producing device 33, hydrogen supply pipe 31 and fuel cell 32 are the same as in energy system 600 described in third exemplary embodiment, and thus the descriptions thereof are omitted. Herein, only portions concerning oxygen storage unit 34, oxygen collecting pipe 35, oxygen circulation pipe 36 and oxygen supply pipe 37 will be described.

In order to collect and store oxygen produced in hydrogen producing device 33, hydrogen storage unit 34 is disposed.

Oxygen collecting pipe 35 extends from one end directed upward (gas discharge port) out of oxygen-side gas-liquid branch pipe 13 of the hydrogen producing cell arranged at the highest position out of hydrogen producing cells constituting hydrogen producing device 33, and oxygen collecting pipe 35 is connected to oxygen storage unit 34.

Oxygen circulation pipe 36 extends from one end directed upward (gas discharge port) out of oxygen-side gas-liquid branch pipe 13 of each of hydrogen producing cells excluding the hydrogen producing cell arranged at the highest position out of hydrogen producing cells constituting hydrogen producing device 33, and oxygen circulation pipe 36 is connected to a pathway of oxygen circulation pipe 36 or a pathway of oxygen collecting pipe 35 of a hydrogen producing cell upwardly adjacent to the above-mentioned hydrogen producing cell.

Oxygen storage unit 34, oxygen collecting pipe 35 and oxygen circulation pipe 36 are formed of a material having a function that it does not allow permeation of oxygen therethrough and does not adsorb oxygen in atmospheric pressure or less. For example, glass, resins, or metals can be used.

Oxygen storage unit 34 has a function of taking in a required amount of oxygen from oxygen collecting pipe 35 and storing the oxygen.

Oxygen supply pipe 37 is disposed so as to be connected to oxygen storage unit 34 at one end and to be connected to fuel cell 32 at the other end.

Oxygen supply pipe 37 is formed of a material having a function that it does not allow permeation of oxygen therethrough and does not adsorb oxygen in atmospheric pressure or less. For example, glass, resins, or metals can be used.

Oxygen storage unit 34 has a function of flowing out a required amount of oxygen of the stored oxygen to oxygen supply pipe 37.

Further, by disposing joint 38 (not shown) on paths of oxygen collecting pipe 35 and oxygen circulation pipe 36 in the same manner as in hydrogen producing unit 420 of second exemplary embodiment, it is possible to form a unit including oxygen collecting pipe 35 and oxygen circulation pipe 36. Joint 38 have only to be those which are composed of a material having a function that it does not allow permeation of oxygen therethrough and does not adsorb oxygen in atmospheric pressure or less, and is a mechanism that does not cause oxygen leakage. For example, rubbers, resins, or metals can be used.

Next, the action of energy system 700 will be described. Of the action of energy system 700, the actions of hydrogen producing device 33, hydrogen supply pipe 31 and fuel cell 32 are the same as those of energy system 600 described in third exemplary embodiment, and thus the descriptions thereof are omitted. Herein, only actions concerning oxygen storage unit 34, oxygen collecting pipe 35, oxygen circulation pipe 36 and oxygen supply pipe 37 will be described.

The oxygen stored in oxygen storage unit 34 of hydrogen producing device 33 once is sent out from oxygen storage unit 34, passes through oxygen supply pipe 37 and is supplied to fuel cell 32 in accordance with the operating state of fuel cell 32. Hydrogen is sent as a negative electrode active material, and oxygen is sent as a positive electrode active material to fuel cell 32, and power generation and hot-water supply are performed in fuel cell 32. Consumed hydrogen and oxygen react with each other to form water and discharged from fuel cell 32. Since energy system 700 of the present exemplary embodiment operates the fuel cell by using pure oxygen, it is an energy system in which energy conversion efficiency of a fuel cell is significantly high as compared with energy system 600 of third exemplary embodiment that utilizes air or the like.

The invention claimed is:

1. A hydrogen producing device comprising:
a plurality of hydrogen producing cells connected to one another, each of the plurality of hydrogen producing cells includes:
 a housing including a surface having a light-transmitting property,
 a separator separating a space within the housing into a hydrogen-side space and an oxygen-side space,
 a counter electrode arranged in the hydrogen-side space,
 an optical semiconductor electrode arranged in the oxygen-side space and formed on a conductive substrate,
 an electrical connection part electrically connecting the optical semiconductor electrode with the counter electrode,
 an electrolyte containing water in the hydrogen-side space and in the oxygen-side space,
 a hydrogen-side electrolyte supply hole penetrating the housing at a first position of the hydrogen-side space and supplying the electrolyte into the hydrogen-side space,
 an oxygen-side electrolyte supply hole penetrating the housing at a second position of the oxygen-side space and supplying the electrolyte into the oxygen-side space,
 a hydrogen-side gas-liquid branch pipe penetrating the housing in contact with the hydrogen-side space at a gas-liquid introduction port of the hydrogen-side gas-liquid branch pipe and arranged at a position higher than a hydrogen producing region of the counter electrode and higher than the first position, and
 an oxygen-side gas-liquid branch pipe penetrating the housing in contact with the oxygen-side space at a gas-liquid introduction port of the oxygen-side gas-liquid branch pipe and arranged at a position higher than an oxygen producing region of the optical semiconductor electrode and higher than the second position, the hydrogen producing device having:
an electrolyte storage unit for sending the electrolyte out to the plurality of hydrogen producing cells and recovering the electrolyte from the plurality of hydrogen producing cells,
a hydrogen-side electrolyte supply pipe extending from the electrolyte storage unit and being connected to the hydrogen-side electrolyte supply hole of a hydrogen producing cell arranged at a highest position out of the plurality of hydrogen producing cells connected to one another,
an oxygen-side electrolyte supply pipe extending from the electrolyte storage unit and being connected to the oxygen-side electrolyte supply hole of the hydrogen producing cell arranged at the highest position out of the plurality of hydrogen producing cells connected to one another,
a hydrogen-side electrolyte circulation pipe extending from a liquid discharge port of the hydrogen-side gas-liquid branch pipe of each of the plurality of hydrogen producing cells excluding a hydrogen producing cell arranged at a lowest position out of the plurality of hydrogen producing cells connected to one another, the hydrogen-side electrolyte circulation pipe connecting the liquid discharge port of the hydrogen-side gas-liquid branch pipe of a given hydrogen producing cell of the plurality of hydrogen producing cells to the hydrogen-side electrolyte supply hole of another hydrogen producing cell of the plurality of hydrogen producing cells arranged beneath the given hydrogen producing cell,
an oxygen-side electrolyte circulation pipe extending from a liquid discharge port of the oxygen-side gas-liquid branch pipe of each of the plurality of hydrogen producing cells excluding the hydrogen producing cell arranged at the lowest position out of the plurality of hydrogen producing cells connected to one another, the oxygen-side electrolyte circulation pipe connecting the liquid discharge port of the oxygen-side gas-liquid branch pipe of the given hydrogen producing cell to the oxygen-side electrolyte supply hole of the another hydrogen producing cell arranged beneath the given hydrogen producing cell,
a hydrogen-side electrolyte recovery pipe extending from the liquid discharge port of the hydrogen-side gas-liquid branch pipe of the hydrogen producing cell arranged at the lowest position out of the plurality of hydrogen producing cells connected to one another and being connected to the electrolyte storage unit, and
an oxygen-side electrolyte recovery pipe extending from the liquid discharge port of the oxygen-side gas-liquid branch pipe of the hydrogen producing cell arranged at the lowest position out of the plurality of hydrogen producing cells connected to one another and being connected to the electrolyte storage unit.

2. A hydrogen producing device comprising:
a plurality of hydrogen producing cells connected to one another each of the plurality of hydrogen producing cells includes:
a housing including a surface having a light-transmitting property,
a separator separating a space within the housing into a hydrogen-side space and an oxygen-side space,
an optical semiconductor electrode arranged in the hydrogen-side space and formed on a conductive substrate,
a counter electrode arranged in the oxygen-side space,
an electrical connection part electrically connecting the optical semiconductor electrode with the counter electrode,
an electrolyte containing water in the hydrogen-side space and in the oxygen-side space,
a hydrogen-side electrolyte supply hole penetrating the housing at a first position of the hydrogen-side space and supplying the electrolyte into the hydrogen-side space,
an oxygen-side electrolyte supply hole penetrating the housing at a second position of the oxygen-side space and supplying the electrolyte into the oxygen-side space,
a hydrogen-side gas-liquid branch pipe penetrating the housing in contact with the hydrogen-side space at a gas-liquid introduction port of the hydrogen-side gas-liquid branch pipe and arranged at a position higher than a hydrogen producing region of the optical semiconductor electrode and higher than the first position, and
an oxygen-side gas-liquid branch pipe penetrating the housing in contact with the oxygen-side space at a gas-liquid introduction port of the oxygen-side gas-liquid branch pipe and arranged at a position higher than an oxygen producing region of the counter electrode and higher than the second position,
the hydrogen producing device having:
an electrolyte storage unit for sending the electrolyte out to the plurality of hydrogen producing cells and recovering the electrolyte from the plurality of hydrogen producing cells,
a hydrogen-side electrolyte supply pipe extending from the electrolyte storage unit and being connected to the hydrogen-side electrolyte supply hole of a hydrogen producing cell arranged at a highest position out of the plurality of hydrogen producing cells connected to one another,
an oxygen-side electrolyte supply pipe extending from the electrolyte storage unit and being connected to the oxygen-side electrolyte supply hole of the hydrogen producing cell arranged at the highest position out of the plurality of hydrogen producing cells connected to one another,
a hydrogen-side electrolyte circulation pipe extending from a liquid discharge port of the hydrogen-side gas-liquid branch pipe of each of the plurality of hydrogen producing cells excluding a hydrogen producing cell arranged at a lowest position out of the plurality of hydrogen producing cells connected to one another, the hydrogen-side electrolyte circulation pipe connecting the liquid discharge port of the hydrogen-side gas-liquid branch pipe of a given hydrogen producing cell of the plurality of hydrogen producing cells to the hydrogen-side electrolyte supply hole of another hydrogen producing cell of the plurality of hydrogen producing cells arranged beneath the given hydrogen producing cell,
an oxygen-side electrolyte circulation pipe extending from a liquid discharge port of the oxygen-side gas-liquid branch pipe of each of the plurality of hydrogen producing cells excluding the hydrogen producing cell arranged at the lowest position out of the plurality of hydrogen producing cells connected to one another, the oxygen-side electrolyte circulation pipe connecting the liquid discharge port of the oxygen-side gas-liquid branch pipe of the given hydrogen producing cell to the oxygen-side electrolyte supply hole of the another hydrogen producing cell arranged beneath the given hydrogen producing cell, a hydrogen-side electrolyte recovery pipe extending from the liquid discharge port of the hydrogen-side gas-liquid branch pipe of the hydrogen producing cell arranged at the lowest position out of the plurality of hydrogen producing cells connected to one another and being connected to the electrolyte storage unit, and an oxygen-side electrolyte recovery pipe extending from the liquid discharge port of the oxygen-side gas-liquid branch pipe of the hydrogen producing cell arranged at the lowest position out of the plurality of hydrogen producing cells connected to one another and being connected to the electrolyte storage unit.

3. The hydrogen producing device according to claim 1 or 2 further comprising:

a hydrogen storage unit for collecting and storing hydrogen produced in the plurality of hydrogen producing cells, a hydrogen collecting pipe extending from a gas discharge port of the hydrogen-side gas-liquid branch pipe of the hydrogen producing cell arranged at the highest position out of the plurality of hydrogen producing cells connected to one another and being connected to the electrolyte storage unit, and a plurality of hydrogen circulation pipes, each of which extends from the gas discharge port of the hydrogen-side gas-liquid branch pipe of a corresponding one of the plurality of hydrogen producing cells of the plurality of hydrogen producing cells excluding the hydrogen producing cell arranged at the highest position out of the plurality of hydrogen producing cells connected to one another, and each of which is connected to the hydrogen circulation pipe of a hydrogen producing cell of the plurality of hydrogen producing cells upwardly adjacent to the corresponding one of the hydrogen producing cells of the plurality of hydrogen producing cells.

4. The hydrogen producing device according to claim 1 or 2, wherein the electrolyte storage unit has a function of adjusting a supply flow rate of the electrolyte so that the electrolyte is prevented from overflowing the hydrogen-side gas-liquid branch pipe and the oxygen-side gas-liquid branch pipe, and simultaneously so that a flow velocity of the electrolyte sufficient for detaching hydrogen bubbles and oxygen bubbles adhering to surfaces of the counter electrode and the optical semiconductor electrode of each of the plurality of hydrogen producing cells is ensured.

5. The hydrogen producing device according to claim 1 or 2, wherein the electrolyte storage unit has a function of intermittently supplying the electrolyte.

6. The hydrogen producing device according to claim 1 or 2, wherein the hydrogen producing device has, in the electrolyte storage unit, a mechanism for externally supplying water and an electrolytic substance.

7. An energy system comprising the hydrogen producing device according to claim 1, the system comprising:
the hydrogen producing device,
a fuel cell, and
a hydrogen supply pipe from a hydrogen storage unit constituting the hydrogen producing device to the fuel cell.

8. The energy system according to claim 7 further comprising:

an oxygen storage unit for collecting and storing oxygen produced in the hydrogen producing cell, an oxygen collecting pipe extending from a gas discharge port of the oxygen-side gas-liquid branch pipe of the hydrogen producing cell arranged at the highest position out of the plurality of hydrogen producing cells connected to one another and being connected to the oxygen storage unit, a plurality of oxygen circulation pipes, each of which extends from a gas discharge port of the oxygen-side gas-liquid branch pipe of a corresponding one of the hydrogen producing cells of the plurality of hydrogen producing cells excluding the hydrogen producing cell arranged at the highest position out of the plurality of hydrogen producing cells connected to one another, and each of which is connected to the oxygen circulation pipe of the hydrogen producing cell of the plurality of hydrogen producing cells upwardly adjacent to the corresponding one of the hydrogen producing cells of the plurality of hydrogen producing cells, and an oxygen supply pipe from the oxygen storage unit to the fuel cell.

9. The hydrogen producing device according to claim 1, further comprising joints which provide division points for any two of the plurality of hydrogen producing cells located vertically adjacent one another, said joints providing for the connection and disconnection of vertically adjacent hydrogen producing cells.

10. An energy system comprising the hydrogen producing device according to claim 2, the system comprising:
the hydrogen producing device,
a fuel cell, and
a hydrogen supply pipe from a hydrogen storage unit constituting the hydrogen producing device to the fuel cell.

11. The energy system according to claim 10 further comprising:

an oxygen storage unit for collecting and storing oxygen produced in the hydrogen producing cell, an oxygen collecting pipe extending from a gas discharge port of the oxygen-side gas-liquid branch pipe of the hydrogen producing cell arranged at the highest position out of the plurality of hydrogen producing cells connected to one another and being connected to the oxygen storage unit, a plurality of oxygen circulation pipes, each of which extends from a gas discharge port of the oxygen-side gas-liquid branch pipe of a corresponding one of the hydrogen producing cells of the plurality of hydrogen producing cells excluding the hydrogen producing cell arranged at the highest position out of the plurality of hydrogen producing cells connected to one another, and each of which is connected to the oxygen circulation pipe of the hydrogen producing cell of the plurality of hydrogen producing cells upwardly adjacent to the corresponding one of the hydrogen producing cells of the plurality of hydrogen producing cells, and an oxygen supply pipe from the oxygen storage unit to the fuel cell.

* * * * *